June 4, 1968  G. M. PRIMM  3,386,756
PIPE FITTING ASSEMBLY
Filed Sept. 13, 1965  3 Sheets-Sheet 3
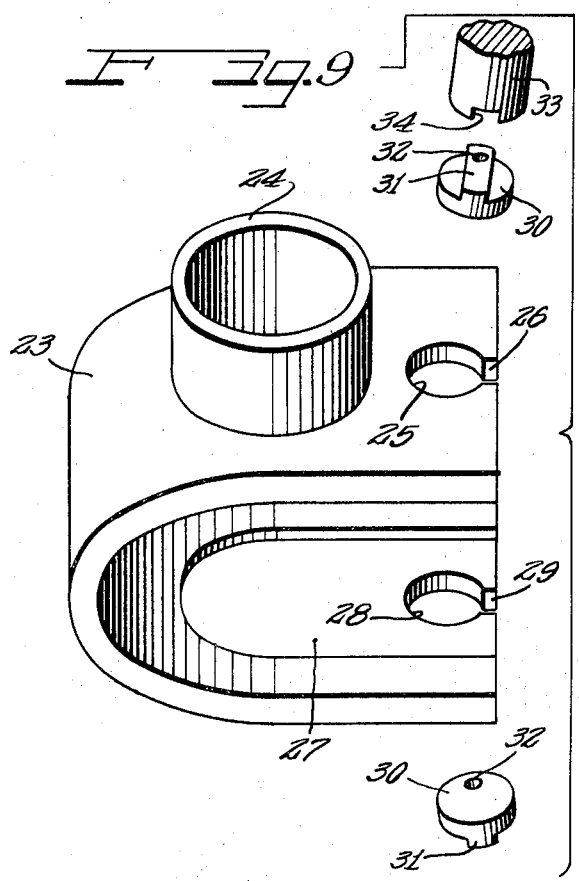
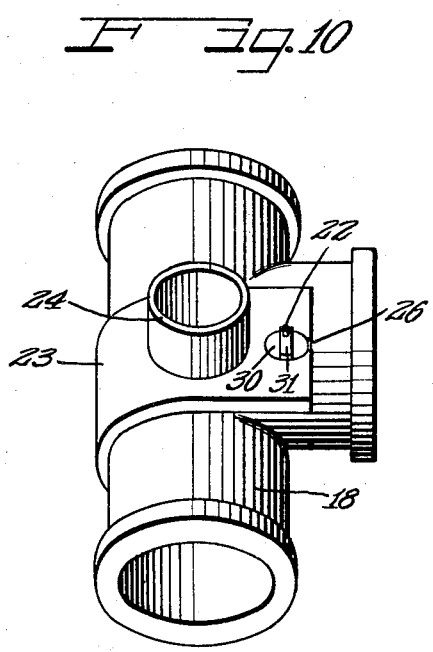
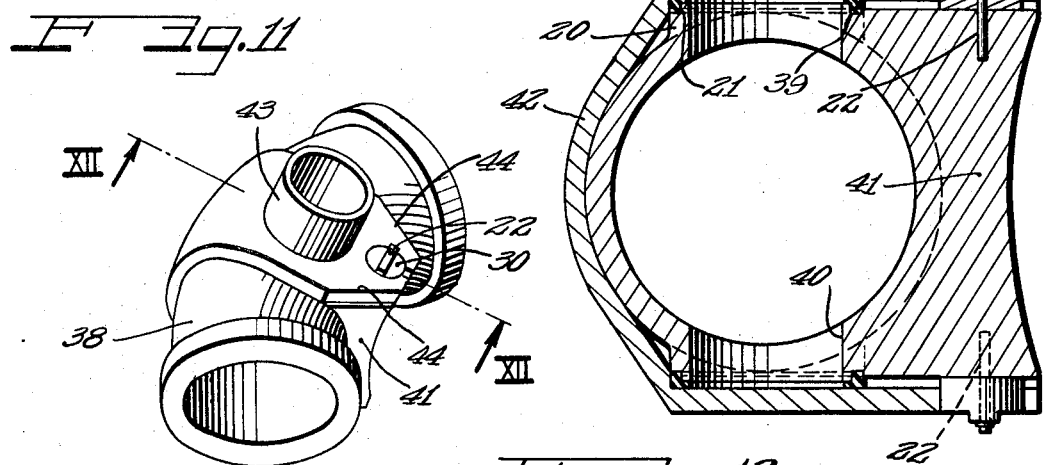
INVENTOR.
George M. Primm
BY Hill Sherman Meroni Gross & Simpson
ATTORNEYS

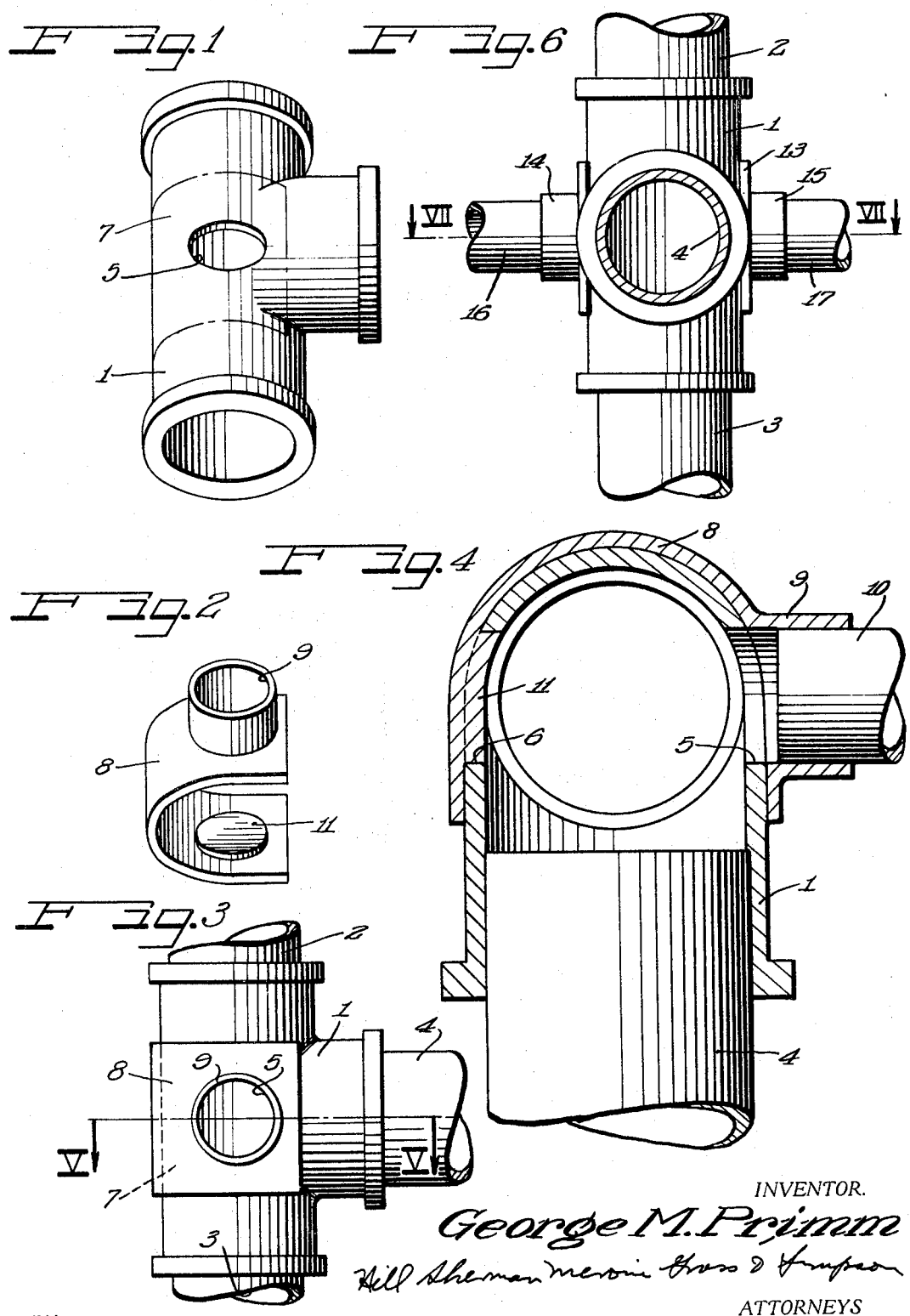

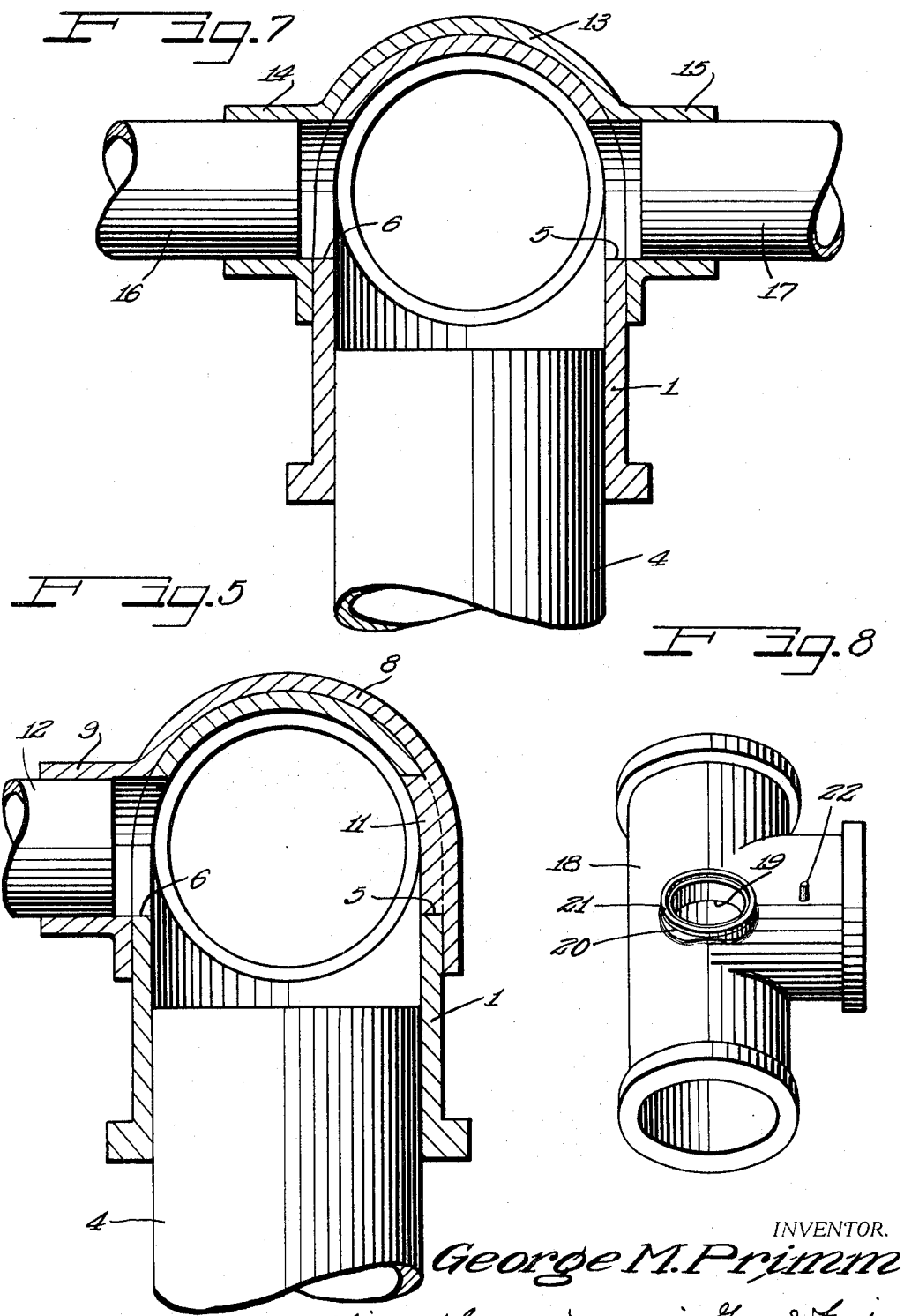

United States Patent Office 3,386,756
Patented June 4, 1968

3,386,756
PIPE FITTING ASSEMBLY
George Merle Primm, 4736 Forest Ave.,
Downers Grove, Ill. 60515
Filed Sept. 13, 1965, Ser. No. 487,022
9 Claims. (Cl. 285—197)

ABSTRACT OF THE DISCLOSURE

Pipe joint or coupling assemblies including means to establish selective branch connections on either or both sides of a fitting.

---

This invention or discovery relates to improvements in a pipe fitting assembly, and more particularly to a pipe fitting assembly which may readily be adjusted when installed to function as any one of a number of commonly known fittings depending upon what type of fitting is needed at the time, although the invention may have other uses and purposes as will be apparent to one skilled in the art.

Heretofore it has been common practice when a new building is to be erected for the plumbing contractor to study the plans and order in advance all the necessary piping and fittings to provide the pipe chains depicted in the plans. Such piping and fittings are delivered in advance so that the plumbing may be installed at the proper time in keeping with the progress of the building and workmen on other parts of the building are not delayed. In the past, however, many delays were unavoidable due to sudden changes in plan during construction of a building. For example, if the building plans showed an outlet, such as a sink, lavatory, or outlet of any other nature to be located on the right hand side of a pipe chain, and it was decided during construction that that particular outlet was preferred on the left hand side of the pipe chain, the right hand fitting previously ordered by the plumbing contractor could not be used to make the proper connection on the opposite side of the pipe chain. Accordingly, an expensive delay ensued while the correct fitting was ordered and delivered. Furthermore, in the past it was necessary for supply houses and the like to maintain a supply of all forms of left and right hand fittings and for a plumbing contractor to be careful in ordering the exact fittings necessary for the particular purpose. Consequently, an objectionable amount of storage room in the supply houses and an objectionable amount of time on the part of the contractor were essential.

With the foregoing in mind, it is an important object of the instant invention to provide a pipe fitting assembly which, at the time of installation, may be readily adjusted or assembled to perform any one of a plurality of functions, such as a left hand cottage T, a right hand cottage T, a left hand cottage Y, a right hand cottage Y, a cottage cross, left and right hand elbows, etc.

Another important object of this invention is the provision of a pipe fitting assembly capable of being installed to function as any one of a plurality of different previously known forms of pipe fittings, the assembly being such as to pass substantially all building codes, and whereby supply houses need not stock all previously known standard types of fittings, and the plumbing contractor need not buy conventional right and left hand fittings or double T's as has been done heretofore.

Another object of this invention is the provision of a pipe fitting assembly which may be readily arranged, at the time of the installation, to function either as a left or right hand fitting.

Still another important feature of this invention is the provision of a pipe fitting assembly capable of functioning as any one of a plurality of different previously known fittings, which assembly may be made of and associated with pipes made of plastic, brass, copper, cast iron, glass, and many other substances.

Still a further desideratum of the instant invention is the provision of a pipe fitting assembly embodying a known type of pipe coupling member, but which member is provided with opposed apertures in opposite sides thereof and accompanied with a strap capable of engaging the coupling so as to leave either of the side openings free for a connection to a branch pipe chain and plug the other opening whereby the coupling may be used either as a right or left hand coupling.

Also an object of this invention is the provision of a pipe fitting assembly embodying a known type of coupling member, but which member is provided with opposed openings in opposite sides thereof, and a strap is engageable with said member in such a manner as to establish connecting means for branch pipes through both of said openings changing the coupling into a cross-type fitting.

While some of the more salient features, advantages, and characteristics of the instant invention have been above pointed out, others will become apparent from the following disclosures, taken in conjunction with the accompanying drawings, in which:

FIGURE 1 is a perspective view of the coupling portion of a pipe fitting assembly embodying principles of the instant invention;

FIGURE 2 is a perspective view of the strap portion of the instant pipe fitting assembly;

FIGURE 3 is a fragmentary elevational view showing the part of FIGURE 1 and the part of FIGURE 2 assembled in operative position;

FIGURE 4 is an enlarged sectional view taken substantially as indicated by the line IV—IV of FIGURE 3, looking in the direction of the arrows, but with the assembly rotated 90° to the right from the position seen in FIGURE 3, for clarity in illustration;

FIGURE 5 is a fragmentary view similar in character and location to FIGURE 4, but showing the parts assembled to afford connection for a branch pipe on the opposite side of the coupling;

FIGURE 6 is a fragmentary part sectional part elevational view illustrating a slightly different form of strap to form a cross-connection;

FIGURE 7 is an enlarged fragmentary plan sectional view taken substantially as indicated by the line VII–VII of FIGURE 6;

FIGURE 8 is a perspective view of a slightly different form of coupling member embodying principles of the instant invention;

FIGURE 9 is a perspective exploded view of a strap and securing means therefor for association with the coupling of FIGURE 8;

FIGURE 10 is a reduced perspective view showing the structure of FIGURE 9 assembled with that of FIGURE 8 ready for operation;

FIGURE 11 is a perspective view of a still different form of coupling and strap member embodying principles of this invention assembled for operation; and FIGURE 12 is an enlarged vertical sectional view taken substantially as indicated by the line XII–XII of FIGURE 11.

As shown on the drawings:

As stated above, the instant invention may be manufactured of substantially any desirable material in keeping with the material of the pipe chain into which it is to be incorporated. Consequently, herein the specific form of connections with the pipe fitting assembly of this invention and pipes embodied in a chain, branch pipes, and the like are not shown in the drawings, since all such types of connections are well known to those skilled in the plumbing art. With the instant invention, the strap member may be attached to the coupling member in many cases in the same manner the coupling member is connected to pipes extending away therefrom. For example, if the pipe chain is of brass or copper and connections are made by sweating, the strap member may be sweated to the coupling member in the instant invention. If the pipe chain is made of plastic and the pipes connected by gluing or welding, the strap member may be glued or welded, as the case may be to the coupling member. In the case of pipes which are not glued, sweated, or welded in establishing connections, such as cast iron, glass, and others, easily operable means are provided, as will more fully later appear herein, for the attachment of the strap members or the coupling member, preferably with the aid of gaskets to insure positive seals. Should pipe connections be made by ordinary pipe threading, attachment means for connecting the strap member to the coupling member are provided, but threaded connections to the strap may readily be provided.

In the first illustrated embodiment of the instant invention, seen in FIGURES 1 to 5 inclusive, there is shown a hollow coupling member 1 in the form of a T having an opening at each end and a side opening for connection to pipes 2, 3 and 4, as seen clearly in FIGURE 3. In this instance the T has been formed with opposed side openings 5 and 6, preferably centrally located to accommodate a branch pipe outlet on either side of the T. As seen in FIGURE 1, the coupling or T 1 is provided with a U-shaped land 7 either by an external formation or by an external finishing operation to intimately receive a U-shaped strap 8 seen in FIGURE 2.

The strap 8, adjacent one end thereof is provided with an opening therethrough surrounded by an outwardly extending nipple 9 for connection with a outlet pipe 10, FIGURE 4. Adjacent the other end thereof the strap is provided with an inwardly extending elevation or plug 11 having a height equal to the thickness of the body of the coupling 1 and a diameter of a size to intimately fit within either of the openings 5 or 6, which are of the same diameter. When this strap is formed of a material such as plastic, brass, copper, it will have an inherent resiliency so that it may be clipped onto the coupling 1 so that the two parts may be handled as a single unit and there is no danger of losing or mislaying the strap until it is permanently attached to the coupling in any suitable manner as explained above. The strap 8 intimately embraces the coupling 1 directly over the land 7, as seen in FIGURE 3. While the plug 11 on the strap should be substantially the same diameter as the openings 5 and 6, it is not necessary that the nipple 9 be of that same diameter, but it could be of a lesser diameter if so desired.

Herein the terms "left" and "right" are used to signify opposite sides of the coupling 1, it being understood that in the case of a horizontal pipe chain, the openings 5 and 6 may actually be at the top and bottom of the T or coupling 1. Assuming that the coupling 1 is connected in a pipe chain including the pipes 2, 3 and 4, and it is desired that the branch piper or chain 10 emanate from the right hand side of the T, the strap is attached to the T or coupling 1 as seen in FIGURE 4 so that the opening 5 in the coupling coincides with the nipple 9 of the strap. The plug 11 will then be intimately seated within the opposite opening 6 in the coupling, effectively plugging that opening. Since the plug 11 has a height equal to the thickness of the wall of the coupling 1 it will substantially coincide with the inside face of the coupling and there will be only a hairline in the pipe the same as occurs at any joint, and no excess friction to fluid flow or sediment catching trap results.

Let it be assumed that during the course of installation of a piping system in a new building, a sudden change of mind occurs, and it is decided that in lieu of the branch pipe 10 leading away from the right hand side of the fitting assembly it is preferred that a branch pipe 12 lead away from the left hand side of the fitting assembly. No delay whatever results due to this change of mind. It is not necessary for the plumbing contractor to stop work and order a new left hand fitting and delay matters until it is obtained. It is simply necessary to reverse the sleeve 8 with respect to the coupling or T 1 and connect it with the coupling in the position seen in FIGURE 5. In this instance, the plug 11 on the strap closes the aperture 5 in the coupling and the nipple 9 coincides with the aperture 6 on the opposite side of the coupling, permitting almost instantaneous change to accommodate the branch pipe 12.

A sleeve and coupling member embodying principles of this invention are sold as a unit and the contractor has a choice as to which side of the coupling member the nipple 9 of the sleeve will be disposed so that the coupling member may be a left or right hand member as may be desired up to the time of installation. It should also be noted that the angle of the nipple 9 relatively to the sleeve itself need not be a right angle, but if a Y connection is desired, the nipple may be at 60 or 45° to the body of the sleeve and an assembly of that character can be ordered initially. The parts may then be assembled at installation time to provide either a left hand or a right hand Y connection.

The instant invention may also be utilized to establish a cross-type connection. With reference now to FIGURES 6 and 7, the same coupling 1 is utilized as previously explained, and a strap 13 having an opening adjacent each end thereof, which openings are surrounded by nipples 14 an 15, may be utilized. The strap is attached to the coupling 1 as above explained, and as seen in FIGURE 7 the nipple 14 will coincide with the opening 6 in the coupling 1 while the nipple 15 will coincide with the opening 5 in the coupling thereby establishing connection points for opposed branch pipes 16 and 17 respectively. The pumbing contractor may purchase an assembly containing a coupling 1 and a strap 13, or the contractor, if desired, may carry a few straps 13 on hand and substitute the strap 13 for the strap 8 in case a decision is made during installation to utilize a cross-type fitting rather than a left hand or right hand fitting.

In FIGURES 8 to 12 inclusive I have shown a T and an elbow type of coupling each of which has a strap therefor to form the respective fitting assembly. While these structures may be used with piping made or substantially any suitable substance, they are especially desirable for use in association with piping with which connections cannot be established by way of gluing, welding or sweating the parts together, such as glass or cast iron piping.

With reference now to FIGURES 8, 9 and 10, a fitting assembly is shown embodying a coupling 18 in the form of a T of the same general shape as the T 1 previously described. This T is provided with an opening 19 on each of opposite sides thereof, but in this instance around that opening is an outwardly extending gasket ring 20 having an annular shoulder at the top thereof as indicated at 21. Adjacent each gasket ring on the leg of the T is an upstanding pin 22 firmly anchored in the T or coupling itself, as best seen in the sectional view of FIGURE 12.

With reference to FIGURE 9, a strap 23 is provided, this strap being of U-shape, but with longer legs than the strap 8 above described. One leg of the strap 23 is provided with an opening therein around which a nipple 24 extends outwardly from the strap. Between the nipple 24 and the adjacent strap end is at aperture 25 which may be of any desirable shape, but which is shown circular in the illustrated instance. A slot 26 extends from the aperture to the edge of the strap end. The other end portion of the strap is provided with a thickened area 27 to overlie a gasket, and adjacent this end of the strap is another opening 28 with a slot 29 extending from the opening through the edge of the strap end, identical in character with the opening 25 and slot 26. A cam member 30 sized to fit intimately in the respective opening 25 or 28 is provided for each of these openings, the cam member being circular in the illustrated instance, and provided with a diametral outstanding rib 31 thereacross. Each cam element is also provided with an offcenter aperture 32 of a size to receive one of the pins 22 in the coupling 18. Each cam member may be partially rotated by means of a suitable tool indicated at 33, having a slot 34 in the lower end thereof to receive the rib 31 on a cam member.

When the parts of this fitting assembly are joined, a gasket 35 is disposed around each of the gasket seats 20, resting on the aforesaid shoulder 21. Each gasket has an inwardly extending lip 36 to overlie the portion of the gasket ring inside the shoulder. This is best seen in FIGURE 12, in which that portion of the structure is identical. The sleeve is next slid over the coupling 18 and the respective gasket, a suitable lubricant being utilized to insure an easy and proper fit between the strap and coupling and adequate contact between the strap and the gaskets. Then, the cams are placed in the respective openings 25 and 28 over the pins 22, and each cam may be held in place by means of a snap ring 37, seen in FIGURE 12. At this point the respective cams will, of course, be disposed with the rib turned somewhat clockwise with respect to the showing in FIGURE 10. Then with the use of the tool 33 the cams are rotated to the position seen in FIGURE 10 whereupon the strap is tightly fitted over the coupling 18 and in water tight contact with the respective gasket 35. Of course, the strap may be placed around the fitting with the nipple 24 coinciding with either opening in the fitting, as may be desired so that a right or left hand fitting may be had at the time of installation.

In FIGURE 11 I have illustrated a pipe fitting assembly which includes an elbow 38 having opposed side openings 39 and 40 each of which is surrounded by a gasket retaining ring 20 of the same type as above explained. In this instance however in order to compensate for the angle in the elbow fitting the elbow is made with a thickened portion 41 on the side thereof having the most acute angle. This portion carries the aforesaid pins 22—22. The same cams 30 are utilized in the manner above described, the only difference being that a strap 42 provided with an opening on one side thereof surrounded by an outwardly extending nipple 43, and the other side being imperforate, is shaped at its end portions in accordance with the shape of the thickened part 41 on the elbow coupling 38 as indicated at 44—44 in FIGURE 11. Here again, the strap may be attached to the elbow of coupling 38 with the nipple 43 coinciding with either of the apertures 39 or 40 depending upon whether or not there is to be a left hand or right hand connection.

From the foregoing, it is apparent that I have provided a novel pipe fitting assembly which is economical, eliminates the need for carrying or selecting numerous fittings of the type known heretofore and which may be assembled to accommodate either a left hand or right hand connection at the time of installation. The assembly may be utilized for T's, elbows, Y's, and various other types of fittings and cross-type fittings may be established whenever desired.

It will be understood that modifications and variations may be effected without departing from the scope of the novel concepts of the present invention.

I claim as my invention:

1. A pipe fitting assembly comprising
a coupling having a passage therethrough and openings for connections in a pipe chain,
said coupling also having a pair of opposed side openings, and
a U-shaped strap having spaced apart end portions and with unconnected ends to clip over said coupling,
said strap having an opening in one end portion adjacent to its end,
a short nipple extending from said one end portion around said opening for selectively connecting a branch pipe to the right or left side of said coupling, and
means for securing said end portions of the strap in sealing relation to the coupling.

2. A pipe fitting assembly comprising
a coupling having a passage therethrough and openings for connections in a pipe chain,
said coupling also having a pair of opposed side openings,
a U-shaped strap to clip over said coupling,
said strap having an opening adjacent one end,
a short nipple extending from the strap around said opening for selectively connecting a branch pipe to the right or left side of said coupling, and
a plug of a height corresponding to the thickness of said coupling integral with and adjacent the other end of said strap to enter and close one of said side openings.

3. A pipe fitting assembly comprising
a coupling having a passage therethrough and openings for connections in a pipe chain,
said coupling also having a pair of opposed side openings,
a U-shaped strap having spaced apart end portions and with unconnected ends to clip over said coupling,
said strap having a respective opening in each of said end portions adjacent to its end to coincide with the side openings in said coupling and form a cross fitting,
a short nipple extending from each of said end portions around each opening therein, and
means for securing said end portions of the strap in sealing relation to the coupling.

4. A pipe fitting assembly comprising
a coupling having a passage therethrough and openings for connections in a pipe chain,
said coupling also having a pair of opposed side openings,
a U-shaped strap having spaced apart end portions and with unconnected ends to clip over said coupling,
said strap having an opening in one end portion adjacent to its end to establish a connection between a branch pipe and one of the side openings in said coupling, and the other end portion being imperforate to overlie and close the opposite side opening in the coupling, and
means for securing said end portions of the strap in sealing relation to the coupling.

5. A pipe fitting assembly comprising
a cottage T having centrally disposed and opposed side openings,
a U-shaped strap having spaced apart end portions and with unconnected ends to partially embrace said T,
said strap having an opening in one end portion adjacent its end with the other end portion thereof being imperforate,
and means for securing said end portions of the strap in sealing relation to the coupling
whereby a branch pipe may be connected to said T selectively at either side thereof.

6. A pipe fitting assembly comprising
a hollow coupling with a plurality of openings for connections in a pipe chain,
said coupling having a pair of opposed side openings,
opposed pins projecting from said coupling adjacent said side openings, and
a U-shaped strap to engage over said coupling, said strap having an opening in one end portion thereof,
a nipple outstanding around said strap opening,
said strap having an aperture adjacent each end thereof with a slot connecting each said aperture with the adjacent end edge of the strap, and
a cam member having an offcenter aperture therein for insertion in each said strap aperture over the respective coupling pin,
whereby said strap may be slid over said coupling passing the pins through said slots, the cam members inserted and turned to tightly engage the strap with the coupling.

7. A pipe fitting assembly comprising
a hollow coupling with a plurality of openings for connections in a pipe chain,
said coupling having a pair of opposed side openings,
opposed pins projecting from said coupling adjacent said side openings, and
a U-shaped strap to engage over said coupling,
said strap having an opening in one end portion thereof,
a nipple outstanding around said strap opening, and
cam means associated with said strap and said coupling to draw said strap into tight engagement with the coupling with said nipple coinciding with a selected one of the coupling side openings.

8. A pipe fitting assembly comprising
a hollow coupling with a plurality of openings for connections in a pipe chain,
said coupling having a pair of opposed side openings,
opposed pins projecting from said coupling adjacent said side openings,
a U-shaped strap to engage over said coupling,
said strap having an opening in one end portion thereof,
a nipple outstanding around said strap opening,
cam means associated with said strap and said coupling to draw said strap into tight engagement with the coupling with said nipple coinciding with a selected one of the coupling side openings,
a gasket ring around each coupling side opening, and
a gasket around each said ring to insure a fluid tight connection between said strap and said coupling.

9. The pipe fitting assembly of claim 3, wherein said plug is curved in accord with the curvature of said coupling to coincide with the interior wall of the coupling.

References Cited

UNITED STATES PATENTS

| 1,683,062 | 9/1928 | Bright | 285—150 |
| 1,850,759 | 3/1932 | MacNeil | 285—150 |
| 2,603,509 | 7/1952 | Eskin et al. | 285—121 |
| 3,272,534 | 9/1966 | Smith | 285—197 |

FOREIGN PATENTS 2,773  9/1964  Belgium.

EDWARD C. ALLEN, *Primary Examiner.*

W. L. SHEDD, *Assistant Examiner.*